Patented June 15, 1943

2,321,598

UNITED STATES PATENT OFFICE 2,321,598

PREPARATION OF DESOXYCHOLIC ACID

Willard M. Hoehn and Alexander W. Schneider, Kansas City, Mo., assignors to George A. Breon & Company, Inc., Kansas City, Mo., a corporation of Missouri No Drawing. Application October 7, 1940,
Serial No. 360,136

21 Claims. (Cl. 260—397.1)

This invention relates to compounds of the cyclopentanopolyhydrophenanthrene series, particularly to the cyclopentanopolyhydrophenanthrol carboxylic acids, and to a method for producing the same.

Among the objects of this invention are the provision of a method for the preparation of cyclopentanopolyhydrophenanthrol carboxylic acids which is adapted to the large scale preparation of such acids from materials which are readily available; to the provision of a method for producing these acids in a substantially pure state, and not contaminated with the substances found at times in the natural compounds; and to the provision of a method for preparing such acids quickly and easily. Other objects will be in part apparent and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

According to the present invention, cyclopentanopolyhydrophenanthrol carboxylic acids, such as desoxycholic acid, $C_{24}H_{40}O_4$, having the formula:

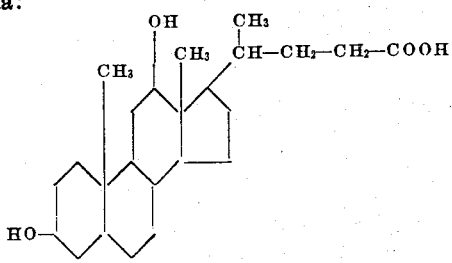

are prepared from the corresponding cholic acid, for example, cholic acid itself of the formula $C_{24}H_{40}O_5$

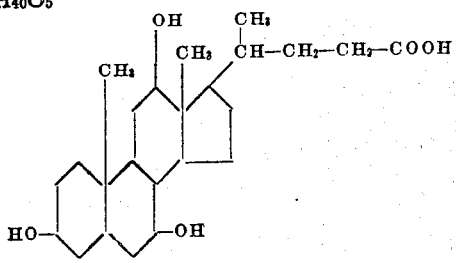

This reaction is carried out by oxidizing the cholic acid compound to form the compound having a keto group in the seven position instead of the hydroxyl group which is present in cholic acid. The corresponding semicarbazone or hydrazone is then formed and this material is reduced to the desired desoxycholic acid.

Cholic acid, or derivatives of cholic acid, are suitable as the starting material, and are readily obtainable in pure form. The derivatives of cholic acid which may be used include the alkyl cholates, such as methyl or ethyl cholate, and the 3-oxy acyl cholic acids. The alkyl esters of cholic acid, such as the 3-acetate of cholic acid, the 3-benzoate of cholic acid, the 3-acetate of methyl or ethyl cholate, and the 3-benzoate of methyl or ethyl cholate, may likewise be employed as starting materials.

Of the three hydroxyl groups in cholic acid, under the conditions of the present invention, the secondary hydroxyl at $C_7$ is oxidized without affecting the hydroxyl groups on the twelfth or third carbon atoms. Under certain circumstances it may be preferable to protect against oxidation the hydroxyl group on the third carbon atom, such as with an acyl group, which can later be removed. Thus, the 3-acetyl or the benzoyl derivative of cholic acid may be employed advantageously. In general, protecting from oxidation the third carbon atom hydroxyl group tends to produce higher yields of the desired desoxycholic acid, and is therefore the preferred form of the present invention.

The oxidation of the secondary hydroxyl group at $C_7$ to form a keto group, is carried out in an inert solvent, such as benzene, toluene, methyl acetate, chloroform or the like, or in acetic acid (glacial or dilute). Suitable oxidizing agents are chromic acid or oxide in dilute acetic acid, potassium dichromate in a dilute mineral acid such as sulfuric acid, and potassium permanganate in aqueous solution, or in aqueous acetic acid.

The keto derivative which is formed by oxidizing the cholic acid, is then preferably treated to form the semicarbazone or the hydrazone. This may be accomplished for example, by treating the ketone with semicarbazide hydrochloride in pyridine to form the semicarbazone, or by reacting the ketone with an aqueous hydrazine hydrate solution to form the corresponding hydrazone. The semicarbazone or hydrazone is then decomposed, for example, by treatment with alkalis such as aqueous sodium or potassium hydroxide solutions, alcoholic sodium or potassium hydroxide solutions, alcoholic sodium alkoxide solution, or sodium benzyloxide. Any suitable alcohol may be employed as the solvent, such as methyl, ethyl, propyl, butyl, etc., alcohol.

The following examples are illustrative only of the present invention.

Example 1

10 g. of cholic acid are dissolved in glacial acetic acid, and oxidized with 55 ml. of a normal chromic oxide solution. The keto-hydroxy acid is then extracted from the reaction mixture with butanol and the butanol extract is then extracted with dilute alkali. The acid is precipitated from its alikali solution with acetic acid, filtered and dissolved in methanol. To the methanol solution 5 g. of semicarbazide hydrochloride and 5 ml. of pyridine are added. The solution is refluxed and the semicarbazone is precipitated by pouring into water. The semicarbazone is then reduced by heating at 200° C. with a solution of 10 g. of sodium in 110 ml. of methanol. The crude acid is precipitated by pouring it into water, purified by forming the magnesium salt, the acid is reobtained, and is crystallized from a 60% solution of acetic acid. The choleic acid obtained is converted to desoxycholic acid by heating in boiling water. The desoxycholic acid obtained by this process has a melting point of 175.5–176° (corr.) and $$[\alpha]^{27°}_D + 56.8° \pm 0.6°$$

Example 2

43 g. of methyl cholate are dissolved in 500 ml. of glacial acetic acid, and are then oxidized with 7.5 g. of chromic oxide in 100 ml. of a 90% solution of acetic acid. The hydroxy-keto ester is precipitated by pouring the reaction mass into water, filtered and dissolved in methanol. The keto compound is then converted to the semicarbazone by refluxing the methanol solution with 14.0 g. of semicarbazide hydrochloride and 9.6 ml. of pyridine. The semicarbazone is precipitated by pouring into water, filtered and reduced with a 20% solution of potassium hydroxide at 165 to 200° C. The crude desoxycholic acid is purified through the magnesium salt, and then by crystallization from 60% acetic acid. The choleic acid obtained is converted to desoxycholic acid by boiling with water. The pure desoxycholic acid obtained by this process has a M. P. of 175.5–176° (corr.) and $$[\alpha]^{27°}_D + 56.8° \pm 0.6°$$

Example 3

200 g. of methyl chlolate are dissolved in benzene, and are mono-benzoylated with one molar equivalent of benzoyl chloride. The benzene solution of the methyl 3-benzoxy-7,12-dihydroxy cholanate is washed with several volumes of water, and is then treated with a solution of 31.0 g. of chromic oxide in 40% acetic acid. The benzene layer is washed free of chromium salts with water, the benzene is removed in vacuo, and the residue is dissolved in methanol. The semicarbazone is prepared by refluxing the methanol solution of the keto-hydroxy ester with 61.9 g. of semicarbazide hydrochloride and 37 ml. of pyridine. Reduction of the semicarbazone is carried out by heating to 200° C. with a 25% solution of potassium hydroxide. The desoxycholic acid is purified as outlined in the previous examples, and has a M. P. of 175.5–176° (corr.) and $$[\alpha]^{27°}_D + 56.8° \pm 0.6°$$

Example 4

10 g. of cholic acid are mono-acetylated with one molar equivalent of acetyl chloride. The mono-actyl derivative is dissolved in benzene, and the benzene solution is washed well with water. The oxidation is carried out by the addition of a solution of 1.75 g. of chromic acid in 40% acetic acid. The benzene layer is washed well with water, the benzene is removed in vacuo and the residue is dissolved in methanol. The semicarbazone is then prepared by refluxing the methanol solution with 5 g. of semicarbazide hydrochloride and 5 ml. of pyridine. The semicarbazone is reduced with a 20% solution of sodium hydroxide in water at 175 to 200° C.. The desoxycholic acid is purified by the methods outlined in Example 1, and has a M. P. of 175.5–176° (corr.) and $$[\alpha]^{27°}_D + 56.8° \pm 0.6°$$

Example 5

10 g. of methyl cholate are dissolved in benzene, and mono-benzoylated with one molar equivalent of benzoyl chloride. The benzene solution of the methyl 3-benzoxy-7,12-dihydroxy cholanate is washed several times with water, and then treated with a solution of 1.55 g. of chromic acid in 40% acetic acid. The benzene layer is washed free of chromium salts with water, the benzene is removed in vacuo and the residue is then dissolved in methanol. The corresponding hydrazone is prepared by refluxing the methanol solution of the keto-hydroxy ester with 5 ml. of 85% hydrazine hydrate solution. The hydrazone is reduced by heating to 180° C. with a solution of 8 g. of sodium in 88 ml. of methanol. The desoxycholic acid is purified as outlined in Example 1, and has a M. P. of 175.5–176° (corr.) and $$[\alpha]^{27°}_D + 56.8° \pm 0.6°$$

In a similar manner, any compound containing the cholic acid nucleus, in which the hydroxyl group in the 7-position is free, may be converted to the corresponding desoxycholic acid by formation of the ketone by oxidation in an inert solvent, followed by reduction of the ketone so formed. The product formed is substantially free from impurities, and the process is adapted to large-scale operation. In addition, since cholic acid and its derivatives, are readily obtainable in pure form, the present invention makes possible the preparation of desoxycholic acid and its derivatives easily and relatively inexpensively.

Attention is directed to our copending application, Serial No. 360,137, filed October 7, 1940.

In view of the above, it will be seen that the several objects of the invention are achieved and other advantageous results attained.

As many changes could be made in the above without departing from the scope of the invention, it is intended that all matter contained in the above description shall be interpreted as illustrative and not in a limiting sense.

What is claimed is:

1. The process for the preparation of a dihydroxy cholanic acid which comprises oxidizing a trihydroxy cholanic acid having a free hydroxyl group in the 7 position, to form an intermediate ketone-containing compound, and substantially completely reducing the ketone group.

2. The process of preparing a desoxycholic acid which comprises oxidizing a cholic acid to an intermediate ketone-containing compound, and substantially completely reducing the ketone group.

3. The process which comprises oxidizing a compound having a cholic acid nucleus in which at least one hydroxyl group is free to form an intermediate ketone-containing compound, and substantially completely reducing the ketone group.

4. The process which comprises oxidizing a substance selected from the group consisting of nor, bis-nor-, etio-cholic acids and derivatives of these acids containing the cholic acid nucleus, to give ketone-containing compounds, and substantially completely reducing the ketone compound to give the analogous desoxycholic acid derivative.

5. The process which comprises oxidizing a cholic acid to an intermediate ketone-containing compound, and substantially completely reducing this ketone group to form a desoxycholic acid.

6. The process which comprises oxidizing cholic acid to an intermediate ketone-containing compound, and substantially completely reducing this ketone group to form desoxycholic acid.

7. The process which comprises oxidizing a derivative of cholic acid containing the cholic acid nucleus to an intermediate ketone-containing compound, and substantially completely reducing this ketone group to yield a desoxycholic acid.

8. A method for the preparation of a dihydroxycholanic acid having secondary hydroxyl groups at $C_3$ and $C_{12}$, comprising oxidizing a trihydroxycholanic acid having secondary hydroxyl groups at $C_3$, $C_7$ and $C_{12}$ to a $C_7$-keto-compound and reducing the keto-compound to replace the keto-oxygen with two hydrogen atoms.

9. A method for the preparation of a dihydroxycholanic acid having secondary hydroxyl groups at $C_3$ and $C_{12}$, comprising oxidizing a trihydroxycholanic acid having secondary hydroxyl groups at $C_3$, $C_7$ and $C_{12}$, and in which the secondary hydroxyl group at $C_3$ is protected against oxidation, to a $C_7$-keto-compound, and reducing the keto-group to a methylene group.

10. A method for the preparation of desoxycholic acid which comprises oxidizing cholic acid to a $C_7$-keto-compound and reducing the ketone group to a methylene group.

11. A method for the preparation of a dihydroxycholanic acid having secondary hydroxyl groups at $C_3$ and $C_{12}$ which comprises oxidizing an alkyl ester of a trihydroxycholanic acid having secondary hydroxy groups at $C_3$, $C_7$, and $C_{12}$ to an intermediate $C_7$-ketone-compound, removing the oxygen of the ketone group and replacing it by two hydrogen atoms.

12. A method for the preparation of a dihydroxycholanic acid having secondary hydroxyl groups at $C_3$ and $C_{12}$ which comprises esterifying the 3-hydroxyl group of a trihydroxycholanic acid having secondary hydroxyl groups at $C_3$, $C_7$ and $C_{12}$, oxidizing the resulting ester to an intermediate $C_7$-ketone-compound, and removing the oxygen of the ketone group and replacing it by two hydrogen atoms.

13. A method for the preparation of a dihydroxycholanic acid having secondary hydroxyl groups at $C_3$ and $C_{12}$ which comprises acylating the 3-hydroxyl of a trihydroxycholanic acid having secondary hydroxyl groups at $C_3$, $C_7$ and $C_{12}$, oxidizing the ester to produce a $C_7$-keto-compound, and removing the oxygen of the ketone group and replacing it by two hydrogen atoms.

14. A method for the preparation of a dihydroxycholanic acid having secondary hydroxyl groups at $C_3$ and $C_{12}$ which comprises oxidizing a trihydroxycholanic acid having secondary hydroxyl groups at $C_3$, $C_7$ and $C_{12}$ and in which the carboxyl group is esterified, to a $C_7$-keto-compound and removing the oxygen of the ketone group and replacing it with two hydrogen atoms.

15. A method for the preparation of a dihydroxycholanic acid having secondary hydroxyl groups at $C_3$ and $C_{12}$ which comprises oxidizing a trihydroxycholanic acid the carboxyl group of which is esterified by an alkyl group, which has secondary hydroxyl groups at $C_3$, $C_7$ and $C_{12}$ and in which the 3-hydroxyl is protected by esterification against oxidation, to a $C_7$-keto-compound and reducing the keto-group to a methylene group.

16. A method for the preparation of a dihydroxycholanic acid having secondary hydroxyl groups at $C_3$ and $C_{12}$ which comprises oxidizing a trihydroxycholanic acid the carboxyl group of which is esterified by an alkyl group, which has secondary hydroxyl groups at $C_3$, $C_7$ and $C_{12}$ and in which the hydroxyl at $C_3$ is protected by acylation against oxidation, and reducing the resulting $C_7$-keto-compound to convert the ketone group to a methylene group.

17. A method for the preparation of a dihydroxycholanic acid having secondary hydroxyl groups at $C_3$ and $C_{12}$ which comprises oxidizing an esterified trihydroxycholanic acid having secondary hydroxyl groups at $C_3$, $C_7$ and $C_{12}$ and in which the $C_3$ hydroxyl is protected by esterification against oxidation, and reducing the resulting $C_7$-keto-compound to convert the ketone group to a methylene group.

18. A method for the preparation of a dihydroxycholanic acid having secondary hydroxyl groups at $C_3$ and $C_{12}$ which comprises oxidizing an esterified trihydroxycholanic acid having secondary hydroxyl groups on $C_3$, $C_7$, $C_{12}$ and in which the hydroxyl at $C_3$ is protected by acylation against oxidation, and reducing the resulting $C_7$-keto-compound to convert the ketone group to a methylene group and simultaneously hydrolyzing the ester groups.

19. A method for the preparation of desoxycholic acid which comprises oxidizing methyl cholate in which the hydroxyl at $C_3$ is protected by esterification against oxidation, and reducing the resulting $C_7$-keto-compound to convert the ketone group to a methylene group.

20. A method for the preparation of desoxycholic acid which comprises oxidizing methyl cholate in which the hydroxyl at $C_3$ is protected by acylation against oxidation, and reducing the resulting $C_7$-keto-compound to convert the ketone group to a methylene group.

21. A method for the preparation of desoxycholic acid which comprises oxidizing methyl 3-benzoxy-7,12-dihydroxycholanate to methyl 3-benzoxy-7-keto-12-hydroxycholanate and reducing the ketone group to a methylene group.

WILLARD M. HOEHN.
ALEXANDER W. SCHNEIDER.